United States Patent [19]
McEwen et al.

[11] Patent Number: 5,344,556
[45] Date of Patent: Sep. 6, 1994

[54] FILTER MEDIA REWINDING MECHANISM

[75] Inventors: Scott M. McEwen, Bowling Green; James S. Thomas, Rudolph; Mark A. Smith, Custer, all of Ohio

[73] Assignee: Henry Filters, Inc., Bowling Green, Ohio

[21] Appl. No.: 21,996

[22] Filed: Feb. 24, 1993

[51] Int. Cl.$^5$ .................. B01D 33/048; B01D 33/80
[52] U.S. Cl. ........................................ 210/91; 210/387
[58] Field of Search ................ 210/85, 143, 387, 400, 210/91; 55/354; 242/55.1, 75, 75.3

[56] References Cited

U.S. PATENT DOCUMENTS

| | | | |
|---|---|---|---|
| 794,631 | 7/1905 | Milne | 210/387 |
| 3,341,148 | 9/1967 | Cooper | 242/75.5 |
| 3,506,128 | 4/1970 | Pashaian | 210/387 |
| 4,693,836 | 9/1987 | Willson | 210/387 |
| 4,715,964 | 12/1987 | Harms et al. | 210/783 |
| 4,761,226 | 8/1988 | Creps | 210/106 |

OTHER PUBLICATIONS

Publication by J. H. Gepfert of Reeves Pulley Company Entitled "Mechanical Systems for Controlling Speed and Tension", pp. 1-4, no date available.

*Primary Examiner*—Joseph W. Drodge
*Attorney, Agent, or Firm*—Brooks & Kushman

[57] ABSTRACT

An improved media filtration apparatus includes an upper tank and lower filtrate compartment, filter media interposed between the upper tank and filtrate compartment for filtering dirty liquid as it is communicated from the upper tank into the filtrate compartment, a conveyor for indexing the filter media in the upper tank and a take-up mechanism including a rotatable idler roller assembly including an idler roller for guiding the filter media and being vertically movable in a range of motion actuates a control to start the take-up mechanism when the idler roller reaches a lower limit of its vertical range of motion and stops the take-up mechanism when the idler roller reaches an upper limit of its vertical range of motion.

8 Claims, 2 Drawing Sheets

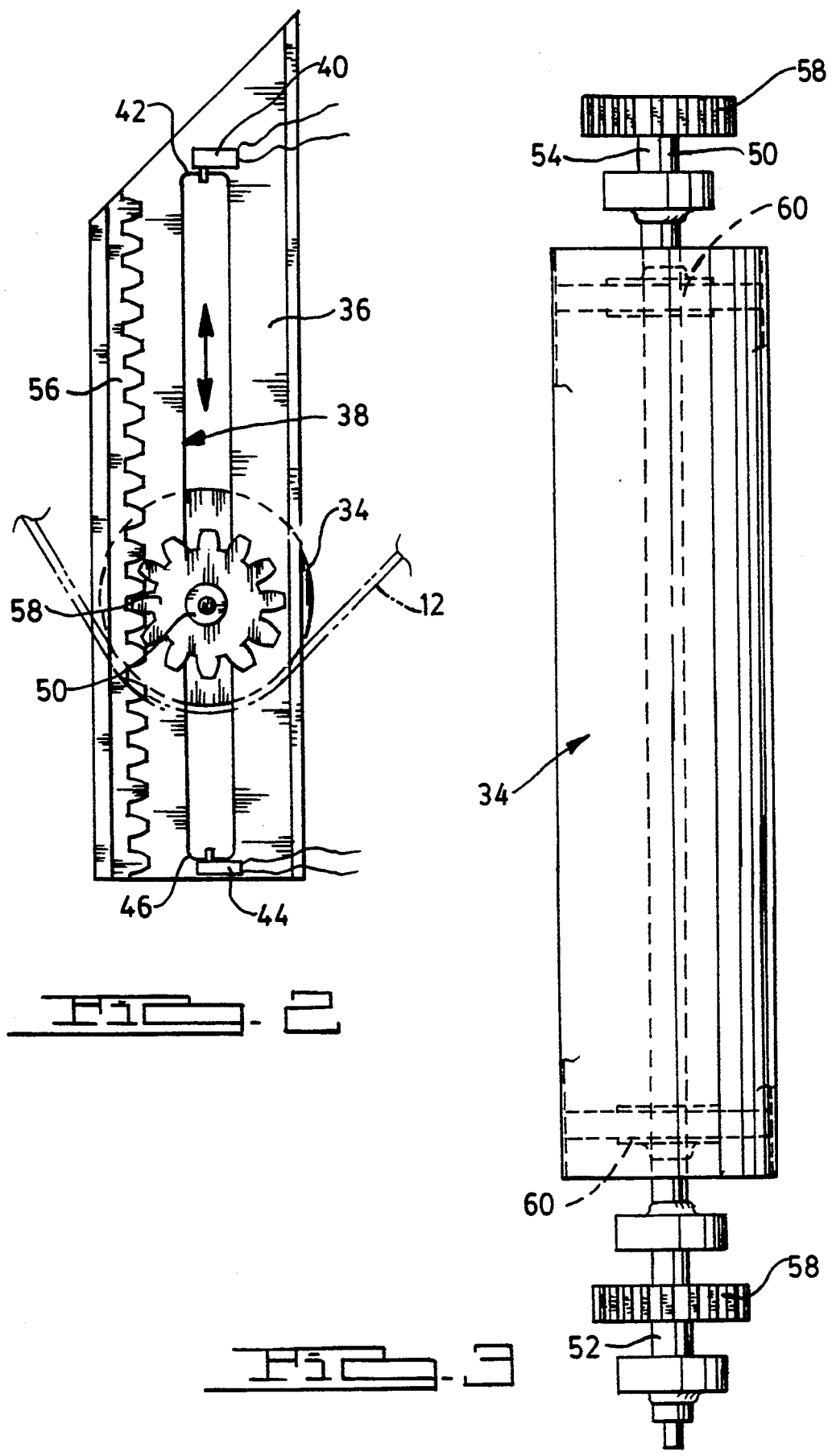

FILTER MEDIA REWINDING MECHANISM

TECHNICAL FIELD

The present invention relates to media filters of the type including a filter tank divided horizontally into an upper dirty liquid tank and a lower filtrate compartment beneath a filter media interposed between the tank and compartment wherein a conveyor is utilized to move the filter media and a take-up mechanism takes-up moved filter media, and more particularly, to an improved media filter filtration apparatus including a mechanism for controlling the take-up mechanism and the tension of the filter media as it is taken-up.

BACKGROUND ART

U.S. Pat. No. 4,761,226, assigned to the assignee of the present invention, discloses a media filter filtration apparatus having an upper filter tank. The upper tank includes a perforate floor provided with a lower filtrate compartment covered with a filter media. The lower compartment is connected to the intake of a pump. The filter media, either a paper web or a fibrous filter aid, is supplied from a roll of the media and moved downwardly along an end wall of the tank and across the floor where the media is indexed by a conveyor. The filter media is moved and subsequently removed when contaminated by advancing the conveyor after any vacuum is relieved. A take-up mechanism is operated in connection with the indexing of the media to take-up the contaminated filter media.

In this arrangement, the take-up mechanism utilizes a pneumatic motor to turn a shaft around which contaminated filter media is rewound. This motor is a constant torque device and as such its use results in varying tension on the contaminated filter media as the spent roll changes in diameter. This often results in the filter media being stretched excessively and the edges of the filter media being pulled toward the center when the spent roll is small causing chip migration. In addition, the pneumatic drive requires a complex system of regulators, oilers, valves and piping that is difficult to maintain and keep running.

SUMMARY OF THE INVENTION

An object of the present invention is to provide an improved media filter filtration apparatus that provides constant tension in the contaminated filter media as it is taken-up.

Another object of the invention is to provide an improved media filter filtration apparatus having a mechanism for providing the tension movable within a range of motion.

A still further object of the present invention is to provide an improved media filter filtration apparatus wherein the tension mechanism controls take-up of the contaminated filter media.

A more specific object of the invention is carried out in an improved filtration apparatus including an upper tank for holding dirty liquid. Such a tank has an imperforate end wall and a perforate floor. A lower filtrate compartment beneath the floor receives liquid from the upper tank through the perforate floor and through filter media disposed between the upper tank and perforate floor.

The filter media is moved downwardly over a guide roller and positioned to guide the filter media along the end wall and along the floor for filtering out contaminants as the dirty liquid is received from the tank into the filtrate compartment. A conveyor moves the filter media within the upper tank. A filter media take-up takes-up contaminated filter media. Such a filtration apparatus is disclosed in detail in U.S. Pat. No. 4,761,226 which is herein incorporated by reference.

The improvement includes a control for starting and stopping the take-up mechanism. The take-up mechanism is operated by an electric motor. A rotatable idler roller assembly includes an idler roller for guiding the contaminated filter media. The idler roller is vertically movable in a range of motion to provide tension to the filter media as it is moved. Movement of the idler roller actuates the control.

When the conveyor is indexed, contaminated filter media emerges from the filter tank. As the contaminated media increases in length, the idler roller moves downwardly. At a lower limit of the idler roller, the control is actuated to start the take-up mechanism. As the take-up mechanism is run, the idler roller moves vertically to an upper limit at which position the control is actuated to stop the take-up mechanism. This arrangement provides constant tension to the contaminated filter media and eliminates the complicated pneumatic drive system.

A support including a track having opposed ends extending in a generally vertical direction is mounted to the filtration apparatus. The support mounts an upper and lower limit switch about either end of the track. The support also mounts the idler roller for movement along the track between the limit switches.

Preferably, the idler roller assembly includes an axle having first and second ends. The axle is independently rotatable relative to the idler roller, and bearings are provided for mounting the idler roller on the axle. A gear rack is mounted on the support adjacent the track and the axle includes a gear on each end, cooperable with the gear rack, and fixedly mounted thereon for engagement with the gear rack. This arrangement restricts any tendency for one end of the axle to move relative to the other end so that the tension is applied equally across both ends of the filter media.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is an enlarged partial sectional elevational view of a rewinding mechanism for providing constant tension on the emerging contaminated filter media illustrating an idler roller and its range of motion; and FIG. 3 is a plan view of the idler roller of FIG. 2.

BEST MODE FOR CARRYING OUT THE INVENTION

Figure 1:
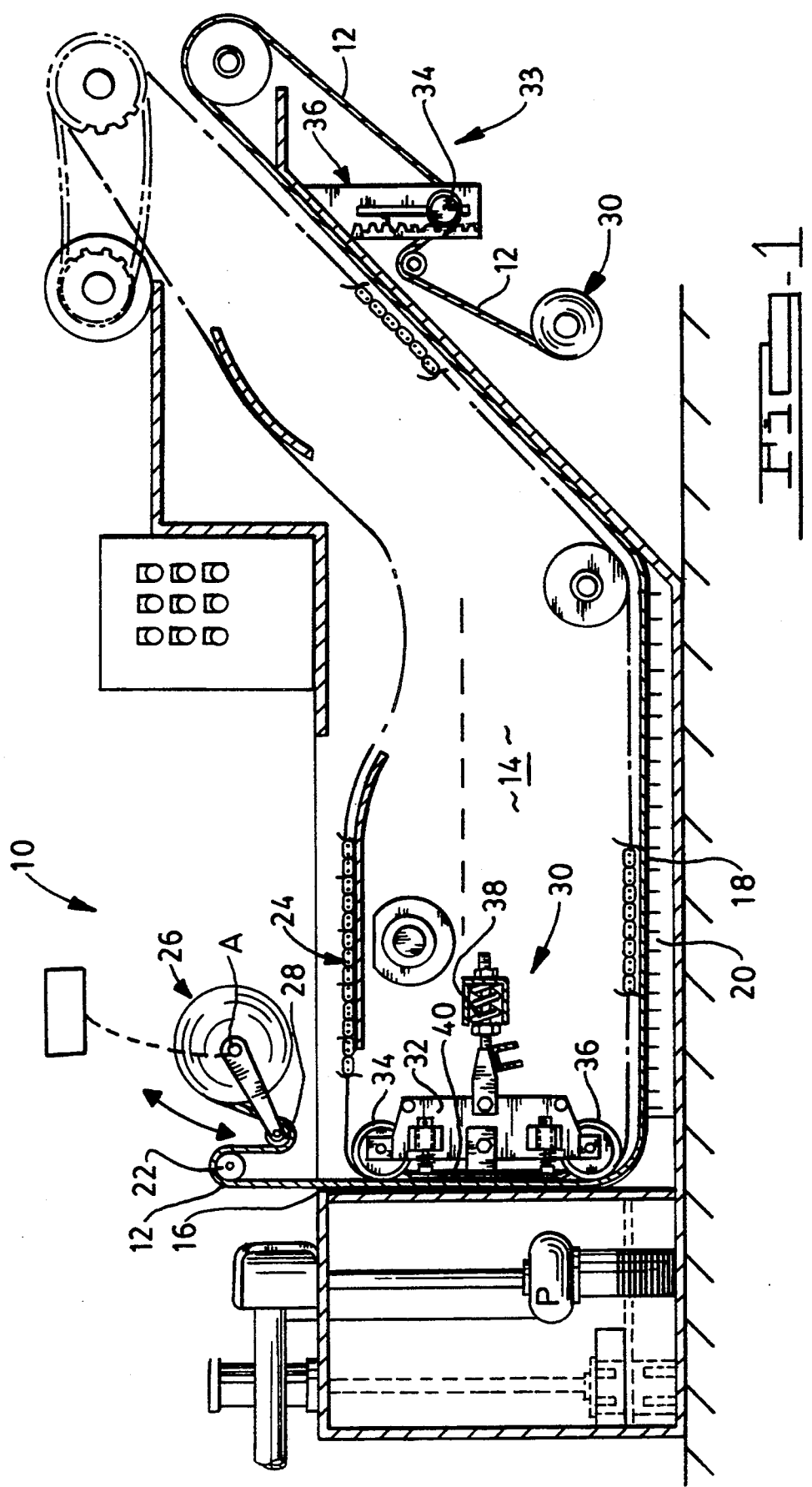
FIG. 1 is a sectional elevational view of a media filter filtration apparatus constructed in accordance with the present invention.

With reference to FIG. 1 of the drawings, an improved media filter filtration apparatus is generally indicated by reference numeral 10 and is used for filtering contaminants out of dirty liquid. As is hereinafter more fully described, the improved filtration apparatus 10 utilizes a disposable filter media 12 such as a paper web or a fibrous filter aid to collect contaminant.

As shown in FIG. 1, the filtration apparatus 10 includes an upper tank 14 for holding dirty liquid. The upper tank 14 has an imperforate end wall 16 and a perforate floor 18. A lower filtrate compartment 20 is located beneath the perforate floor 18 and receives liquid from the upper tank through the perforate floor. The filter media 12 is interposed between the upper tank 14 and perforate floor 18 to capture and retain contaminant from the dirty liquid being communicated from the upper tank 14 into the lower filtrate compartment 20.

A guide roller 22 is mounted above the upper tank 14 and guides the filter media 12 from a filter media feed mechanism 26 along the end wall 16 and along the floor 18.

An endless chain and slat conveyor 24 is operable to index the filter media 12 in the upper tank 14. A filter media take-up mechanism 30 including an electric motor assembly takes-up spent filter media 12 as it emerges from the apparatus 10 as the conveyor 24 is indexed.

An assembly 32 is shown in FIG. 1 which biases filter media 12 against inperforate end wall 16. Assembly 32 has rollers 34 and 36 which support a carriage carrying a plate 40. The carriage and plate 40 are biased by a spring 38 to hold the filter media 12 against imperforate end wall 16.

With continued reference to FIG. 1 and with reference to FIGS. 2 and 3, a rotatable idler assembly 33 including a weighted idler roller 34, for guiding the spent filter media 12, is mounted on the filtration apparatus 10 adjacent the take-up mechanism. A support 36 including a track 38 mounts idler roller 34 for vertical movement in a range of motion to provide tension to the filter media 12 as it is moved. Support 36 mounts an upper limit switch 40 at an upper end 42 of track 38 and a lower limit switch 44 at the lower end 46 of the track.

As the conveyor 24 is indexed, the spent filter media 12 emerges from filter tank 14. As this occurs, the total length of spent filter media 12 begins to increase and the weighted idler roller 34 begins to move downwardly along track 38. When idler roller 38 contacts lower limit switch 44, the switch is tripped to energize the electric motor of the take-up mechanism. The take-up mechanism takes-up filter media 12 as it emerges from the filter tank 14. When the conveyor 24 indexing is completed, filter media 12 stops emerging from filter tank 14. However, the media take-up 30 continues to take-up filter media 12 causing the idler roller 34 to rise.

When the idler roller 34 rises high enough to contact upper limit switch 40, that switch is tripped to stop the take-up 30. This action provides constant tension to the filter media 12 emerging from the filter tank 14.

With further reference to FIGS. 2 and 3, the preferred idler roller 34 includes an axle 50 having first and second ends 52,54. Axle 50 is independently rotatable relative to rotation of idler roller 34. Support 36 includes a gear rack 56 adjacent the track 38. Axle ends 52,54 include gears 58 cooperable with gear rack 56. Gears 58 are fixedly mounted on axle 50 for engagement with the gear rack 56 whereby movement of axle ends 52,54 is synchronous so that both ends move upwardly and downwardly simultaneously. Bearings 60 mount idler roller 34 to axle 50.

While the best mode for carrying out the invention has been described in detail, those familiar with the art to which this invention relates will recognize various alternative designs and embodiments for practicing the invention as defined by the following claims.

What is claimed is:

1. An improved filtration apparatus using a filter media to filter contaminants from a dirty liquid, the filtration apparatus comprising:
   an upper tank for holding dirty liquid and having an imperforate end wall and a perforate floor, and a lower filtrate compartment beneath the floor for receiving liquid from the upper tank through said perforate floor;
   a guide roller over which the filter media is moved downwardly and positioned to guide the filter media along the end wall and along the floor for filtering ut contaminants as the dirty liquid is received from the upper tank into the filtrate compartment;
   conveyor means for indexing the filter media to effect emergence of the contaminated filter media from the upper tank and to begin to increase the total length of said contaminated filter media emerging from said upper tank;
   a filter media take-up mechanism for taking-up filter media;
   control means for starting and stopping the take-up mechanism; and
   a rotatable idler roller assembly including an idler roller for guiding said contaminated filter media and being vertically moveable in a range of motion arranged to take up the increased length of said contaminated filter media and to provide tension to the contaminated filter media as it is indexed from the upper tank by the conveyor means;
   said roller assembly actuating said control means to start the take-up mechanism when said idler roller reaches a lower limit of its vertical range of motion and said roller assembly actuating said control means to stop the take-up mechanism when said roller reaches an upper limit of its vertical range of motion.

2. The improvement of claim 1 wherein said control means includes an upper and lower limit switch.

3. The improvement of claim 2 further including a support mounted to the apparatus; said support including a track having opposed ends and mounting said upper and lower limit switches about either end; said support also mounting said idler roller for movement along said track between said limit switches 4. The improvement of claim 3 wherein said idler roller assembly includes an axle having first and second ends; said axle being independently rotatable relative to said idler roller.

5. The improvement of claim 4 wherein said support includes a gear rack adjacent said track and said axle includes a gear on each end, cooperable with said gear rack, and fixedly mounted thereon for engagement with said gear rack whereby movement of both ends of said axle is synchronous.

6. The improvement of claim 5 wherein said idler roller assembly also includes a bearing mounted thereto for mounting said idler roller on said axle.

7. The improvement of claim 2 wherein the take-up mechanism includes an electric motor driven assembly.

8. An improved filtration apparatus using a filter media to filter contaminants from a dirty liquid, the filtration apparatus comprising:
   an upper tank for holding dirty liquid and having an imperforate end wall and a perforate floor, and a lower filtrate compartment beneath the floor for receiving liquid from the upper tank through said perforate floor;

a guide roller over which filter media is moved downwardly and positioned to guide the filter media along the end wall and along the perforate floor of the upper tank for filtering out contaminants as the dirty liquid is received from the upper tank into the filtrate compartment;

conveyor means for indexing the filter media to effect emergence of the contaminated filter media from the upper tank and to begin to increase the total length of said contaminated filter media emerging from said upper tank;

a filter media take-up mechanism for taking-up filter media; and a rotatable idler roller assembly including a support and an idler roller mounted thereon; said idler roller guiding said filter media and being vertically movable along said support in a range of motion arranged to take up the increased length of said contaminated filter media and to provide tension to the filter media as the filter media is indexed from the upper tank by the conveyor means; said rotatable idler assembly also including upper and lower limit switches mounted to said support as upper and lower limits of said range of motion;

said idler roller actuating said lower switch to start the take-up mechanism when said idler roller reaches a lower limit of its vertical range of motion and said idler roller actuating said upper switch to stop the take-up mechanism when said roller reaches an upper limit of its vertical range of motion.

* * * * *